United States Patent
Saulgeot et al.

[15] 3,698,774
[45] Oct. 17, 1972

[54] SPINDLE ASSEMBLY AIR BEARINGS

[72] Inventors: Claude Saulgeot, Annecy; Jean-Noel Coste, Poisy, both of France

[73] Assignee: Compagnie Industrielle Des Telecommunications Cit-Alcatel, Paris, France

[22] Filed: May 19, 1971

[21] Appl. No.: 144,939

[30] Foreign Application Priority Data

May 20, 1970 France..................7018207

[52] U.S. Cl..................................308/9
[51] Int. Cl..............................F16c 19/16
[58] Field of Search...........................308/9

[56] References Cited

UNITED STATES PATENTS 3,493,273  2/1970  Greenberg...............308/9

Primary Examiner—Edgar W. Geoghegan
Assistant Examiner—Frank Susko
Attorney—Sughrue, Rothwell, Mion, Zinn & Macpeak

[57] ABSTRACT

A spindle assembly includes a sleeve bearing having a number of air nozzles equi-angularly arranged about a shaft. A thrust bearing supports one end of the shaft with clearances for air support. The air nozzles generally have a frusto-conical air passage with a central bore.

9 Claims, 8 Drawing Figures

PATENTED OCT 17 1972 3,698,774

INVENTORS
CLAUDE SAULGEOT
JEAN-NOEL COSTE

BY Sughrue, Rothwell, Mion,
Zinn & Macpeak
ATTORNEYS

SPINDLE ASSEMBLY AIR BEARINGS

BACKGROUND OF THE INVENTION

1. Field of the Invention

The present invention concerns a spindle assembly and more particularly, an air bearing system for the spindle assembly.

2. Description of the Prior Art

In certain applications, more particularly control and machining operations requiring a high degree of precision, workpieces or the like must be mounted on spindles for rotation with a rotation precision of the order of one-tenth, or even one-hundredth, of a micron. Spindle assemblies in which conventional bearings are employed are not generally capable of providing such precision, and this has led to the development of various bearing structures employing fluids. A fluid injected under pressure between the moving and fixed parts of such a spindle assembly should enable these portions to be maintained strictly concentric.

Devices so far proposed for carrying this out have presented a number of disadvantages. It has been observed that the arrangements for injecting the fluid under pressure can support only relatively low pressures, resulting in insufficient rigidity of the bearing arrangements produced.

Furthermore, the fluid supply nozzles must be strictly identical, which has been found particularly difficult thereby leading to pressure irregularities and faulty operation.

Also, such arrangements can generally carry only those workpieces or the like which are relatively light, so limiting their field of application.

SUMMARY OF THE INVENTION

In accordance with the present invention, a spindle assembly comprises: a sleeve bearing surrounding a shaft so as to provide a predetermined clearance between them; nozzles for supplying air under pressure to the clearance, arranged in groups in each of which the nozzles are equi-angularly spaced around the shaft axis; a thrust bearing on the shaft comprising a flange located with respective predetermined second and third clearances between a face formed on the sleeve bearing, and an abutment flange attached to the sleeve bearing by a circular distance piece surrounding the flange; and nozzles for supplying air under pressure to the first and second clearances, arranged in groups equi-angularly spaced around the shaft axis; the air supply nozzles each comprising a generally frusto-conical air passage in a central portion of which is formed a bore of substantially constant circular cross-section communicating on its upstream side with a cup forming a convergent zone in the passage.

BRIEF DESCRIPTION OF THE DRAWINGS

The invention will now be described in more detail, by way of examples only, and with reference to the accompanying diagrammatic drawings in which.

DESCRIPTION OF THE PREFERRED EMBODIMENTS

Figure 1:
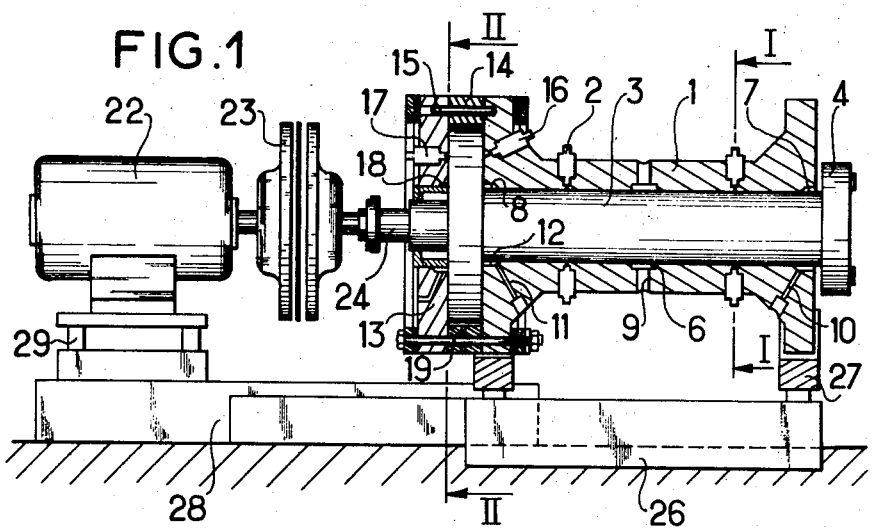
FIG. 1 is a longitudinal section through a spindle assembly.

Referring to FIG. 1, the spindle comprises a sleeve bearing 1 surrounding a shaft 3 so as to provide a predetermined clearance between them. Nozzles 2 for supplying air under pressure to this clearance are arranged in two groups, each of four nozzles equi-angularly spaced around the shaft axis. Each nozzle 2 is connected to a source of compressed air.

At one end the shaft 3 carries a flange 4 to which a workpiece or the like may be attached. A thrust bearing on the shaft comprises a bearing flange 12 located with respectively predetermined second and third clearances between an end face formed perpendicular to the shaft axis on the end of the sleeve bearing 1, and an abutment flange 13 attached to the sleeve bearing 1 by a circular distance piece 14 surrounding the flange. The abutment flange 13 and distance piece 14 are fastened to the sleeve bearing 1 by means of a set of bolts such as that shown in FIG. 1.

The faces of bearing flange 12 are machined flat and perpendicular to the shaft axis, as are the opposed annular faces of the distance piece 14. The axial length of the distance piece 14 is such as to ensure the required clearances between each face of the flange 12 and either the end face of the sleeve bearing 1 or the face of abutment flange 13.

A first set of three equi-angularly spaced nozzles 16 are mounted in the sleeve bearing 1 to supply air under pressure to the second clearance, between flange 12 and the end face of sleeve bearing 1. The nozzles 16 are connected to the source of compressed air. A further set of three equi-angularly spaced nozzles 17 supply air under pressure to the third clearance, that between flange 12 and the abutment flange 13. Nozzles 17 are equally connected to a compressed air supply (not shown).

The sleeve bearing 1 is formed with a central air release groove 6 and with similar grooves 7,8 at its opposite ends. Each of these grooves communicates with atmosphere via respective conduits 9, 10 and 11. Air is bled from the thrust bearing by grooves 18 and conduit 19.

The shaft 3 is driven by an electric motor 22 through a flexible coupling 23 linked to a journal 24 on the shaft. The flexible coupling 23 compensates for any bad alignment of the motor axis with that of the shaft 3.

The spindle assembly is mounted on a base plate 26 through support vee 27. The motor 22 is mounted on a base 28 by rubber shock absorbers 29.

Figure 2:
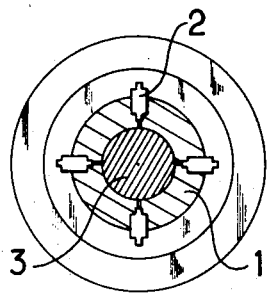
FIG. 2 is a section on the line and in the direction of the arrows I—I of FIG. 1.

FIG. 2 shows how the nozzles 2 are equi-angularly spaced around the axis of shaft 3, being carried by the sleeve bearing 1.

Figure 3:
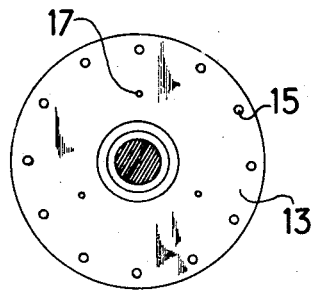
FIG. 3 is a section on the line and in the direction indicated by the arrows II—II in FIG. 1.

FIG. 3 discloses how the nozzles 17 are equi-angularly spaced around the shaft axis.

Figure 4:
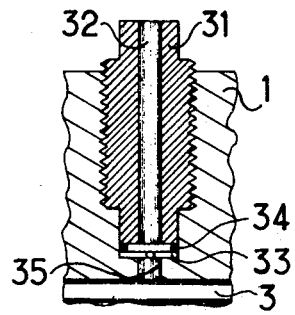
FIGS. 4 through 8 show cross-sectional details of various air supply nozzles for the spindle assembly.

FIG. 4 shows one of the nozzles 2. It is to be understood that the other nozzles 16 and 17 are generally similar to the nozzles 2.

The nozzle 2 comprises a generally cylindrical body 31 screw-threaded into the sleeve bearing 1, formed with an axial bore 32 the outermost end of which is connected to the compressed air source and the innermost end of which bears against an O-ring 34 and an apertured metal disc 33. The bore 32 and the aperture of disc 33 are aligned with an injection orifice 35 machined in the sleeve bearing 1.

Figure 5:
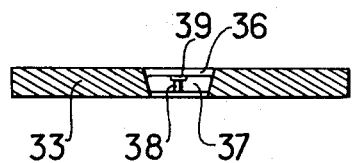

FIG. 5 is a diametral section through the disc 33 formed with a frusto-conical aperture 36 which tapers to provide a convergent passage in the direction of fluid flow. Within the frusto-conical bore 36 is disposed a circular member 37 in the center of which, co-axially with bore 36, is formed a bore 38 of substantially constant circular cross-section, formed with a particularly regular and homogenous surface. This communicates on its upstream side with a cup 39 providing a convergent zone in the air passage. The cup 39 may be hemispherical or generally frusto-conical.

The bore 38 constitutes a thin-walled orifice in the air supply path.

Figure 6:
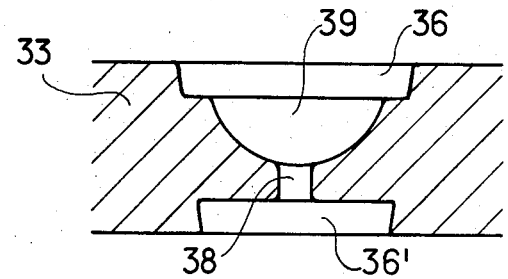
Figure 7:
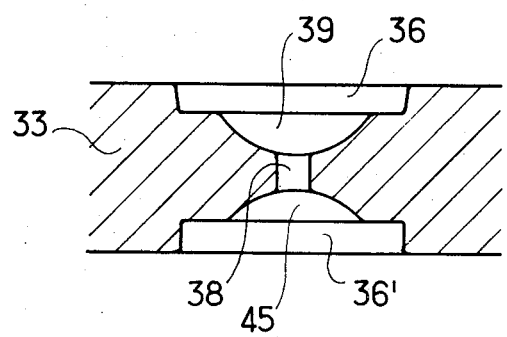
Figure 8:
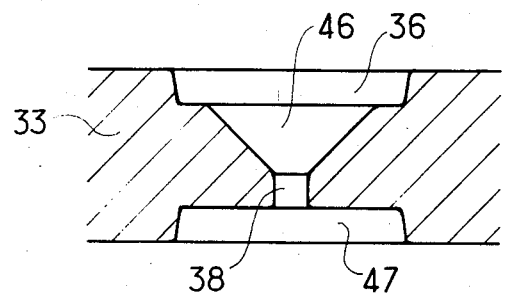

FIGS. 6 to 8 show, in an enlarged scale, three forms for the aperture in disc 33. While in FIGS. 6 to 8 the apertures are formed in the disc proper, it will be appreciated that they may be formed in the same way as that shown in FIG. 5, namely with an intermediary element such as 37.

FIG. 6 shows a generally frusto-conical bore with inlet 36' and outlet 36' with, in a central region, a bore 38 of substantially constant circular cross-section. The bore 38 is formed with a particularly regular and homogenous surface. On its upstream side it communicates with a hemispherical cup 39 providing a convergent zone in the air passage.

In FIG. 7, the air passage begins with a generally frusto-conical section 36 leading to a hemispherical cup 39, a passage 38 of substantially constant circular cross-section, a further hemispherical cup 45, and ending in a generally annular zone 36'. The cup 45 forms a divergent zone in the passage, while the cup 39, as before, forms a convergent zone.

In FIG. 8 the air passage begins with a generally frusto-conical section 36, leading to a frusto-conical convergent section 46 communicating with the inlet end of a passage 38 of substantially constant circular cross-section, terminating in a divergent frusto-conical section 47. The axial length of section 47 is substantially equal to that of passage 38.

In all the forms of air passage just described, the inlets and outlets of each passage section are well rounded to avoid turbulence in the airflow.

Diametrically opposed nozzles in the sleeve bearing 1 must be rigorously identical, and all nozzles 16 must be identical, as must all nozzles 17.

The apertured disc 33, or its insert 37, are advantageously made of a dense and hard material.

The spindle assembly operates as follows:

When a load is fastened to the shaft 3, by means of flange 4, it brings about a certain eccentricity of the shaft 3 with respect to the sleeve bearing 1. A minimum clearance zone is thus formed between these two elements, bringing about a smaller gas flow and higher gas pressure than in the maximum clearance zone where flow is greater but the pressure less. The resulting lift effect tends to correct this, so as to maintain rotation with a high degree of radial precision, with regular distribution of the injected air between the shaft and its bearing structure.

The spindle assembly described above has a number of advantages.

The air supply nozzles can withstand high pressures. The high flow rates which result provide great rigidity of the bearing end of the thrust bearing of the spindle assembly.

The homogenous distribution of air between the rotor and stator enables variations in the flow to be avoided, with consequent precision of rotation. Precision of the order of one-hundredth of a micron may be obtainable.

The spindle assembly is able to support heavy workpieces or the like, permitting application in a wide range of machine tools and control apparatus.

The simple structure of the spindle assembly enables the constituent components to be machined with high accuracy at a reasonable price.

What is claimed is:

1. A spindle assembly having a shaft on which workpieces are mounted comprises;
    a sleeve bearing surrounding the shaft and providing a predetermined clearance between them;
    first air nozzles for supplying pressurized air to the clearance are arranged equi-angularly in the sleeve bearing about the shaft;
    a circular distance piece;
    an abutment flange attached to the sleeve bearing by the circular distance piece; and
    thrust bearing means including a bearing flange, and second and third air nozzles for supplying pressurized air to the bearing flange, the air nozzles each have a generally frusto-conical air passage with a central substantially circular cross-sectional bore communicating on its upstream side with a cup providing a convergent zone for the air supply.

2. An assembly as claimed in claim 1, in which the cup is substantially hemispherical.

3. An assembly as claimed in claim 1, in which the bore communicates on its downstream side with a further cup providing a divergent zone in the passage.

4. An assembly as claimed in claim 3, in which the further cup is substantially hemispherical.

5. An assembly as claimed in claim 4, in which the cup has an axial length substantially equal to that of the bore.

6. An assembly as claimed in claim 5, further including a disc member, the bore of substantially circular cross-section and the cup being formed in the disc member which is disposed within the generally frusto-conical air nozzle passage.

7. An assembly as claimed in claim 6, in which the disc member is characterized by high hardness.

8. An assembly as claimed in claim 7, in which each of the air supply nozzles of the thrust bearing means is arranged to provide identical air flows.

9. An assembly as claimed in claim 8, in which the air nozzles of the sleeve bearing are arranged diametrically opposite each other and provide equal air flows.

* * * * *